Oct. 22, 1968          R. F. LACEY          3,407,295
ELIMINATION OF FREQUENCY PULLING DUE TO ZEEMAN
RESONANCE IN THALLIUM ATOMIC BEAM TUBES
Filed July 7, 1966                    2 Sheets-Sheet 1

INVENTOR.
RICHARD F. LACEY
BY
ATTORNEY

Oct. 22, 1968 R. F. LACEY 3,407,295
ELIMINATION OF FREQUENCY PULLING DUE TO ZEEMAN
RESONANCE IN THALLIUM ATOMIC BEAM TUBES
Filed July 7, 1966 2 Sheets-Sheet 2
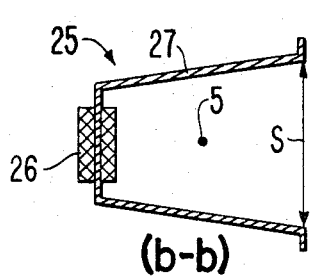
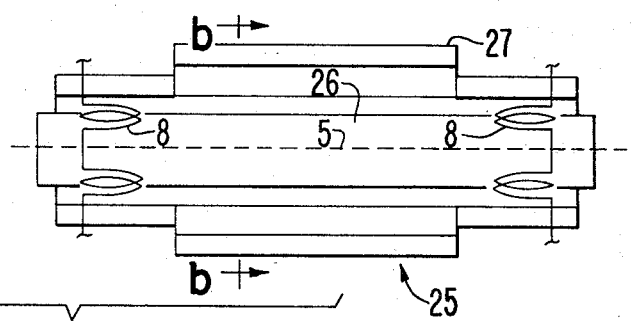
FIG. 2b
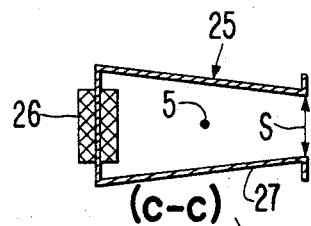
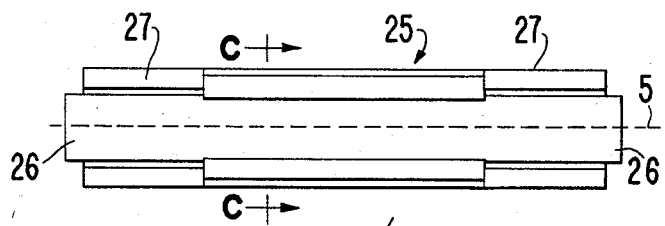
FIG. 2c
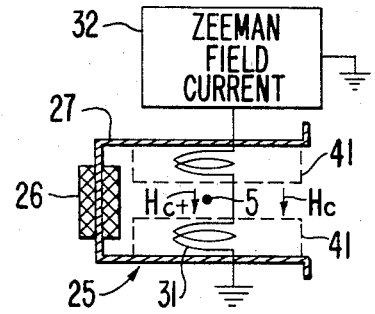
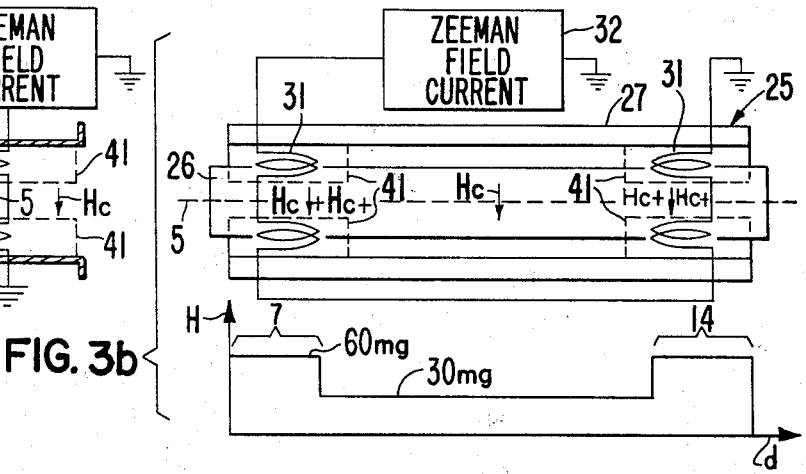
FIG. 3a  FIG. 3b
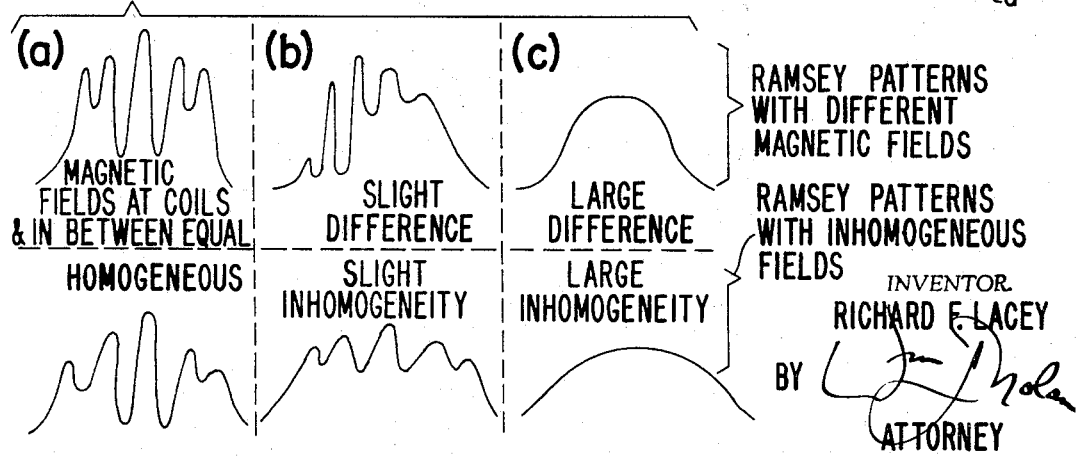
FIG. 4
INVENTOR.
RICHARD F. LACEY
BY
ATTORNEY

United States Patent Office 3,407,295
Patented Oct. 22, 1968

3,407,295
ELIMINATION OF FREQUENCY PULLING DUE TO ZEEMAN RESONANCE IN THALLIUM ATOMIC BEAM TUBES
Richard F. Lacey, Salem, Mass., assignor, by mesne assignments, to Hewlett-Packard Company, Palo Alto, Calif., a corporation of California
Filed July 7, 1966, Ser. No. 563,462
10 Claims. (Cl. 250—41.3)

ABSTRACT OF THE DISCLOSURE

An atomic beam tube having a non-uniform magnetic field in the C-field region which destroys phase coherence of the atoms in an atomic beam between the two Zeeman resonance regions, thereby eliminating frequency pulling of the hyperfine resonance frequency. The non-uniform magnetic field may be a magnetic field gradient transverse to the atomic beam path, or a magnetic field differential along the beam axis.

---

Figure 1:
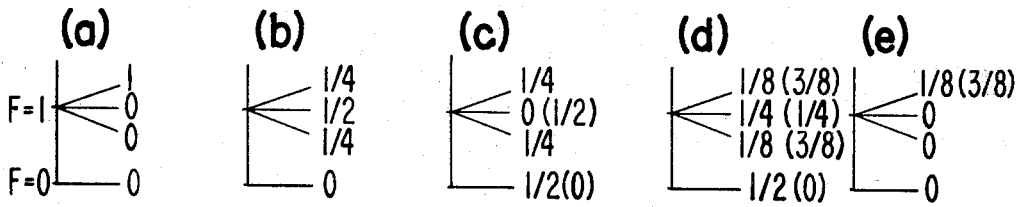
Figure 1:
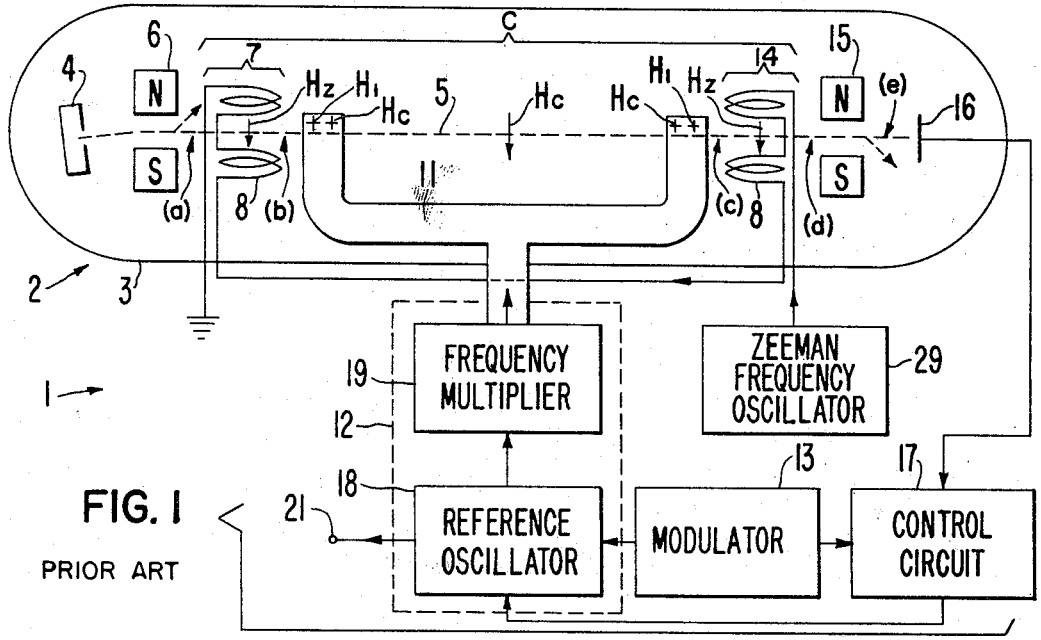

The present invention relates in general to thallium atomic beam tubes and, more particularly, to an improved beam tube wherein frequency pulling of the thallium hyperfine resonance frequency due to Zeeman resonance used in the energy state selectors is eliminated by destroying the phase coherence of the Zeeman resonance in the C-field or low magnetic field region of the beam. Such improved thallium beam tubes are especially useful as frequency standards or atomic clocks.

Heretofore, thallium atomic beam tubes have been proposed wherein the energy state selecting process for the beam was enhanced by the provision of a pair of Zeeman resonance regions straddling the hyperfine resonance region of the beam. It turns out that the Zeeman resonance regions are desirable because the atoms in the desired upper magnetic-field-independent hyperfine energy state ($F=1$, $m=0$) are characterized by an extremely weak magnetic moment. As a consequence it is extremely difficult by means of conventional energy state selecting magnets alone to produce a beam of thallium atoms in the upper magnetic field independent hyperfine energy state for interaction with a cavity resonator and to detect resonance of the beam. However, the upper magnetic field dependent hyperfine energy levels (Zeeman levels) have a strong mognetic moment and by first forming the beam of atoms in the upper Zeeman level and passing these atoms through a Zeeman resonance region the field independent levels are populated for subsequent hyperfine resonance in the conventional C-field region. Hyperfine resonance is detected by passing the beam through a second Zeeman resonance region to redistribute the populations of the hyperfine energy levels. Then the beam is passed through a second state selecting magnet which deflects to the target detector atoms in a field dependent level. Since the field dependent energy level population differs depending upon whether the beam atoms experienced a hyperfine field independent resonance in the C-field region, the detected signal is representative of field independent hyperfine resonance. The problem with the prior system was that there was phase coherence between the Zeeman levels and between these and the oscillating magnetic fields used to induce Zeeman resonances in the Zeeman resonance region. This phase coherence caused a pulling of the apparent field independent hyperfine resonance frequency and a consequent shift in the output frequency of the frequency standard of which the thallium beam tube was a part. Theoretically it is possible to avoid this frequency pulling effect by very carefully selecting and controlling the frequency of the common Zeeman frequency signal generator and by carefully controlling the field strength of the applied Zeeman frequency magnetic field. However, these precise controls are not practical in view of the alternatives provided by the present invention.

It has been proposed by others to provide two separate Zeeman frequency oscillators operating at slightly different frequencies to prevent the aforementioned phase coherence and frequency pulling of the field independent resonance transiton. However, such a solution requires separate oscillators operating at nearly the same frequency and there is a possibility that due to extraneous coupling one oscillator could pull the other to its frequency, unless elaborate precautions were employed.

In the present invention, the undesired Zeeman resonance pulling is eliminated by operating upon the magnetic C-field to destroy the phase coherence between the Zeeman levels, and between these and the oscillating fields that induce the Zeeman resonances. In one embodiment of the present invention the phase coherence is removed by producing a magnetic field gradient across the cross section of the atomic beam in the C-field region between the Zeeman interaction or resonance regions. In another embodiment of the present invention the undesired phase coherence is eliminated by changing the magnetic field intensity in the C-field region inbetween the Zeeman interaction regions relative to the C-field intensity in the Zeeman interaction regions.

The principal object of the present invention is the provision of an improved thallium beam tube useful as an atomic clock or frequency standard.

One feature of the present invention is the provision in a thallium beam tube of means operative upon the magnetic C-field for removing phase coherence between the Zeeman levels of the atoms of the beam in the C-field region and in the Zeeman resonance regions thereof whereby Zeeman pulling of the field independent hyperfine resonance frequency is eliminated.

Another feature of the present invention is the same as the preceding feature wherein the phase coherence between the Zeeman levels of the atoms of the beam in the C-field region and the Zeeman resonance regions thereof is removed by providing a magnetic field gradient across the beam path in the region between the Zeeman resonance regions.

Another feature of the present invention is the same as the first feature wherein the phase coherence between the Zeeman levels of the atoms of the beam in the C-field region and in the Zeeman resonance regions thereof is removed by changing the magnetic field intensity in the region between the two Zeeman resonance regions.

Other features and advantages of the present invention will become apparent upon a perusal of the following specification taken in connection with the accompanying drawings wherein:

FIG. 1 is a schematic line diagram of a thallium beam tube employing features of the present invention, and also depicting the energy level diagrams representative of populated energy states at successive positions along the beam path, FIG. 2($a$–$c$) are schematic line diagrams of a C-field region of the beam showing alternative apparatus for producing a transverse gradient in the C-field across the beam path, FIG. 3($a$ and $b$) is a composite schematic line diagram depicting apparatus for producing a change in the intensity of the C-field intensity in the drift space relative to the field in the Zeeman resonance regions and also depicting the magnetic profile along the beam path, and FIG. 4 is a series of low frequency Zeeman resonance spectrums showing the Ramsey pattern of the beam resonance for various conditions of transverse gradient and longitudinal field profile for the apparatus of FIGS. 2 and 3.

Referring now to FIG. 1 there is shown a thallium beam tube frequency standard 1 incorporating features of the present invention. The standard 1 includes a thallium beam tube 2 having an enclosing elongated vacuum envelope 3. An oven beam source 4 is disposed at one end of the tube 2. The oven 4 projects a beam of thallium atoms into a beam path 5. The beam upon leaving the oven 4 has atoms populating both the ground state and the sublevels of the first upper hyperfine energy state. A hexapole state selecting magnet 6 is disposed to receive the beam and to deflect toward the axis of the beam atoms in the upper magnetic field dependent hyperfine energy level ($F=1$, $m=1$) as shown in diagram (a). These atoms are deflected from a position off axis of the magnet to a trajectory which is parallel to the axis of the beam 5. Other levels are either not substantially deflected, or are deflected out of the beam. Undeflected atoms are stopped by stops, i.e., metal disks, not shown, which are disposed on the longitudinal axis either at the entrance or exit path of the hexapole state selector magnet 6. In the energy level diagram (a)–(e), the numerals at the ends of the energy level lines (0, 1, ¼, ⅛, ⅜, etc.) indicate their relative population densities at the similarly labeled positions along the beam path.

The beam then enters a Zeeman resonance region 7 for redistributing the populations of the upper hyperfine energy levels. More particularly, an audio frequency magnetic field at the Zeeman resonance frequency is applied to the beam in the presence of a transverse C-field as of 30 to 60 milligauss produced by a conventional U-shaped C-field magnet to produce a 90° Zeeman resonance precession of the ($F=1$, $m=+1$) level atoms. This produces a redistribution of the population densities of the ($F=1$, $m=0$) ($F=1$, $m=+1$) and ($F=1$, $m=-1$) energy levels as shown by energy diagram (b). One important thing to note is that the magnetic field independent energy level ($F=1$, $m=0$) has been populated. The 90° precession is produced by applying an alternating magnetic field Hz. at right angles to the C-field and at the Zeeman resonance frequency which for thallium is 1.4/3 mHz./ gauss. At a C-field intensity of, for example, 60 milligauss the applied signal is about 28 kHz. The alternating field is applied via an audio frequency coil 8 with its axis oriented at right angles to the C-field and excited by current supplied from an oscillator 9 at the Zeeman resonance frequency. The intensity of the applied alternating magnetic field is selected such that in the time of flight of a thallium atom through the alternating magnetic field Hz. of the Zeeman resonance region the magnetic moment of the hyperfine atom will be rotated (precessed) by 90°.

The beam then passes through a conventional split field C-field cavity resonator structure 11 excited at the field independent hyperfine resonance frequency for the ($F=1$, $m=0$) to ($F=0$, $m=0$) transition at 21.310833946 gHz. The microwave energy for exciting the transition is supplied to the cavity from a microwave generator 12. When the applied microwave magnetic field $H_1$, which is applied parallel to the C-field, is at precisely the field independent hyperfine frequency a transition in the beam is obtained and the energy levels are populated as shown by FIG. (c). The microwave frequency from the generator 12 is modulated through resonance by modulator 13 to cause the population densities of the beam to represent alternatively those of resonance and those without resonance, as indicated by the numerals in parenthesis in the energy level diagrams. Thus, the field independent level ($F=1$, $m=0$) is alternatively populated and depopulated at some convenient frequency such as 10 Hz.

The beam then passes through a second Zeeman resonance region 14 substantially identical to region 7 described previously, to redistribute the populations of the energy levels as indicated by level diagram labeled (d). The distribution in parenthesis is without hyperfine resonance in the C-field cavity 11. The beam population shifts between one population condition and the other at the modulation frequency of the modulator 13.

The beam then passes into a second hexapole state selective magnet assembly 15, substantially identical to the first state selective magnet 6. The second state selective magnet 15 serves to deflect out of the beam certain atoms not in the upper Zeeman sublevel ($F=1$, $m=+1$) and to cause certain others not to be deflected and thus stopped by the stops described previously with regard to magnet 6. The atoms focused into the beam pass on to a detector 16 to produce an output signal. The atoms of the beam passing on to the detector 16 populate the upper Zeeman sublevel as shown by the energy level diagram labeled (e). It is seen that with hyperfine resonance in the C-field region that a maximum of ⅛ of the original beam atoms which passed through the first state selecting magnet 6 reach the detector 16, whereas without resonance ⅜ of such original atoms reach the detector 16. Thus there is produced an output resonance signal at the modulation frequency which is fed to a control circuit 17 wherein it is phase sensitively detected to give an error signal for controlling the frequency of a reference oscillator 18 at some convenient low frequency such as 5 mHz. and forming a part of the microwave generator 12. One output of the low frequency reference oscillator 18 is fed through a suitable frequency multiplier 19 to supply the microwave signal to the C-field cavity resonator 11. Another output of the phase locked reference oscillator 18 is taken out at the terminal 21 to provide the output of the frequency standard 7.

The sysem thus far described is the prior art system and suffers from frequency pulling of the output frequency due to the Zeeman resonance regions 7 and 14 being phase coherent, i.e., the atoms passing through the first Zeeman resonance region 7 continue to precess at a certain frequency which is the same as that applied in the second region 14. Therefore the atoms of the beam all enter the second Zeeman region in a certain phase relation and at the same frequency as the applied alternating field in the second Zeeman region. This constitutes a phase coherence between the two Zeeman resonance regions which changes the relative population densities of the energy levels leaving the second Zeeman region in such a manner as to appear as a frequency shift or pulling of the hyperfine resonance frequency. This apparent pulling effect is eliminated by removing phase coherence between the two Zeeman resonance regions.

In the present invention two methods are provided for removing phase coherence between the first and second Zeeman resonance regions 7 and 14. In the first method, as illustrated in FIGS. 2 (a)–(c), a gradient is introduced across the beam in the C-field region between the two Zeeman regions 7 and 14. This destroys any phase coherence between the Zeeman resonance regions 7 and 14. The second method is illustrated in FIG. 3 and includes means for changing the C-field intensity in the drift region between the Zeeman region to a value different than the Zeeman region field. This destroys phase coherence of the resonance between the two Zeeman regions 7 and 14.

Figure 2A:
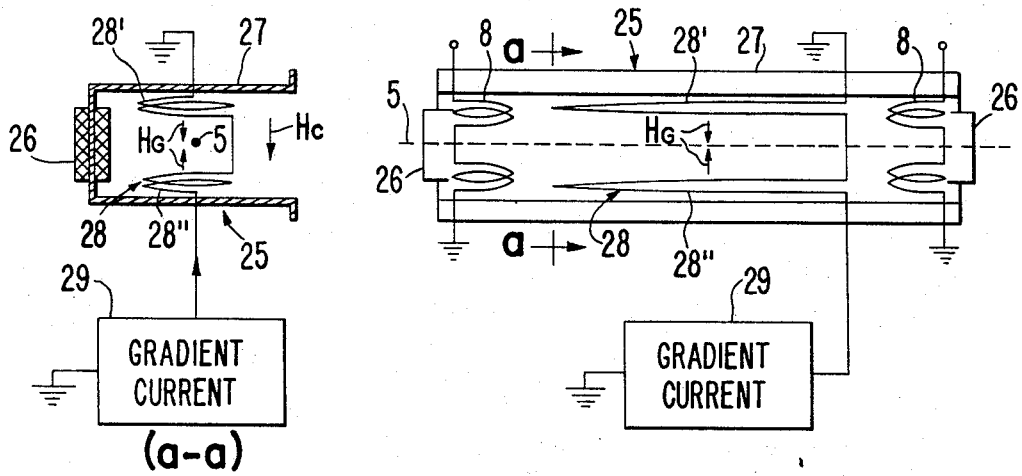

Referring now to FIGS. 2(a)–2(c) the gradient in the C-field may be introduced in a number of different ways. The C-field is produced by an elongated U-shaped electromagnet 25 which extends along the beam path 5 and produces a transverse D.C. magnetic field Hc as of 30 to 60 milligauss. A conventional magnetic shield, not shown, surrounds the magnet 25 for shielding out the earth's field and other extraneous fields. The electro-magnet 25 includes an energizing coil 26 wound around the base leg of the U-shaped magnetic member 27 as of high permeability nickel-iron alloy such as materials sold by the Allegheny Ludlum Steel Corp. under the trademarks Mumetal or Moly Permalloy.

A gradient producing coil 28 is shown in FIG. 2(a). The coil 28 has two series connected magnetic bucking coil portions 28′ and 28″ straddling the beam inside the electromagnet 25. The gradient coil 28 is energized from a current source 29. In the structure of FIG. 2(b), the gradient is produced by increasing the distance between the two leg portions of the U-shaped magnetic member 27 as compared to the end regions of the magnet 25. By making the spacing S between the leg portions increase toward their ends a transverse gradient in the C-field is obtained. In the structure of FIG. 2(c), the gradient in the C-field is produced by decreasing the spacing S between the leg portions near their ends. In the case of the structure of FIGS. 2(b) and (c) the changes in the spacing S have been exaggerated for the sake of explanation.

Referring now to FIG. 3 there is shown an apparatus, using the second method, for preventing phase coherence between the two Zeeman resonance regions. The apparatus consists of a pair of series connected coils 31 wound in the Zeeman resonance regions 7 and 14 each wound to produce an additional field component Hc+ which is parallel to C-field Hc produced by the electromagnet 25. The current for the coils 31 is supplied from a Zeeman field current supply 32. The field profile is as shown in FIG. 3(b) where the C-field is increased to 60 milligauss in the two Zeeman resonance regions 7 and 14 and left at 30 milligauss in the region therebetween.

Alternatively, the C-field intensity Hc+ is increased to, for example, 60 milligauss by means of magnetic shim members 41 which are inserted into the gap of the electromagnet 25 in the Zeeman resonance regions 7 and 14 to decrease the gap of the electromagnet 25 in the Zeeman resonance regions 7 and 14.

The required amplitude of the field inhomogeniety (gradient) for the cases of FIG. 2 or the field difference for the case of FIG. 3 to eliminate frequency pulling of the output signal may be determined from the Zeeman resonance line fine structure (Ramsey pattern) superimposed upon the Zeeman resonance line output signal. This is observed by connecting an oscilloscope not shown, to the output of the detector 16 and observing the output as a function of a sweep of the Zeeman frequency oscillator 9. The microwave generator 12 is disconnected for this observation. The gradient or field difference is adjusted until the Zeeman resonance fine structure is reduced to substantially zero amplitude, as shown in the series of Zeeman spectrum signals of FIG. 4. The proper final condition is shown by spectrum traces 4(c). With the C-field difference or C-field gradient just sufficient to produce Zeeman output spectra as shown in FIG. 4(c), the Zeeman frequency pulling will be eliminated when the tube 2 is operated with the microwave field applied.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A thallium beam tube apparatus including means providing a source of thallium atoms, means for projecting the thallium atoms over an elongated beam path, means for shielding a region of the beam path from external magnetic fields and for applying a polarizing magnetic field to the beam path to define a C-field region, energy state selecting means disposed upstream and downstream from said C-field region, means forming a cavity resonator disposed along the beam path in the C-field region for exciting a field independent hyperfine resonance of the thallium atoms, means disposed in the C-field region upstream and downstream from said cavity resonator means for exciting Zeeman resonance of atoms in the beam to redistribute the population densities of the upper hyperfine energy states of the atoms in the beam, means for producing non-uniformities in the magnetic field of the C-field region for removing phase coherence between the Zeeman resonance regions thereof to eliminate substantial frequency pulling of the field independent hyperfine resonance frequency, and means for detecting field independent hyperfine resonance of the beam to produce a resonance output signal by detecting changes in the intensity of the beam of atoms emerging from said downstream state selecting means.

2. The apparatus of claim 1 wherein said means for removing phase coherence comprises means for producing a magnetic field gradient across the beam path in the region between the spaced Zeeman resonance regions.

3. The apparatus of claim 2 wherein said means for producing a magnetic field gradient across the beam path produces a sufficiently large gradient to substantially eliminate the Ramsey pattern from the output field dependent resonance spectrum signal in the absence of field independent hyperfine resonance of the beam.

4. The apparatus of claim 2 wherein said means for producing a gradient across the beam includes a coil having a pair of coil portions straddling the beam path and wound and energized with current to produce bucking magnetic field components in the beam path in the region of space in between the pair of coil portions.

5. The apparatus of claim 2 wherein said means for applying the C-field comprises a U-shaped cross section electromagnet, and wherein said means for producing the gradient changes the spacing between the legs of said U-shaped electromagnet as a function of the distance taken in a direction along the legs and away from the base leg connecting portion of the U-shaped electromagnet.

6. The apparatus of claim 1 wherein said means for removing phase coherence comprises means for producing a magnetic field intensity over the C-field region between the spaced Zeeman resonance regions which have a substantially different intensity than the magnetic field intensity over the Zeeman resonance regions.

7. The apparatus of claim 6 wherein said means for producing the different field intensity in the space between the Zeeman resonance regions produces a sufficiently large difference in the field intensities to substantially eliminate the Ramsey pattern from the output field dependent resonance spectrum signal in the absence of field independent hyperfine resonance of the beam.

8. The apparatus of claim 6 wherein said means for producing a different intensity magnetic field over the beam path comprises a pair of coils with one of said coils disposed in each of the Zeeman resonance regions for producing a magnetic field component in each of these regions which is superimposed upon an existing C-field component that also exists in the region between the spaced Zeeman resonance regions.

9. The apparatus of claim 6 wherein said means for applying a magnetic field over the C-field region of the beam path comprises a magnet having a gap coextensive with a portion of the beam path to define the C-field region of the beam, and wherein said means for producing a different intensity magnetic field includes magnetic permeable means disposed in said magnet gap and coextensive with a portion of the C-field region of the beam path for shunting a portion of the C-field magnetic flux through said magnetically permeable means to produce the different intensity of C-field in the Zeeman resonance regions as compared to the C-field region in between the Zeeman resonance regions.

10. The apparatus of claim 9 wherein said magnetic permeable means are disposed axially coextensively with said Zeeman resonance regions.

References Cited

UNITED STATES PATENTS 2,972,115   2/1961   Zacharias et al. _____ 331—3

WILLIAM F. LINDQUIST, *Primary Examiner.*